Sept. 2, 1952     H. C. EARLY     2,609,450
RADIO FREQUENCY WATTMETER
Filed April 30, 1946
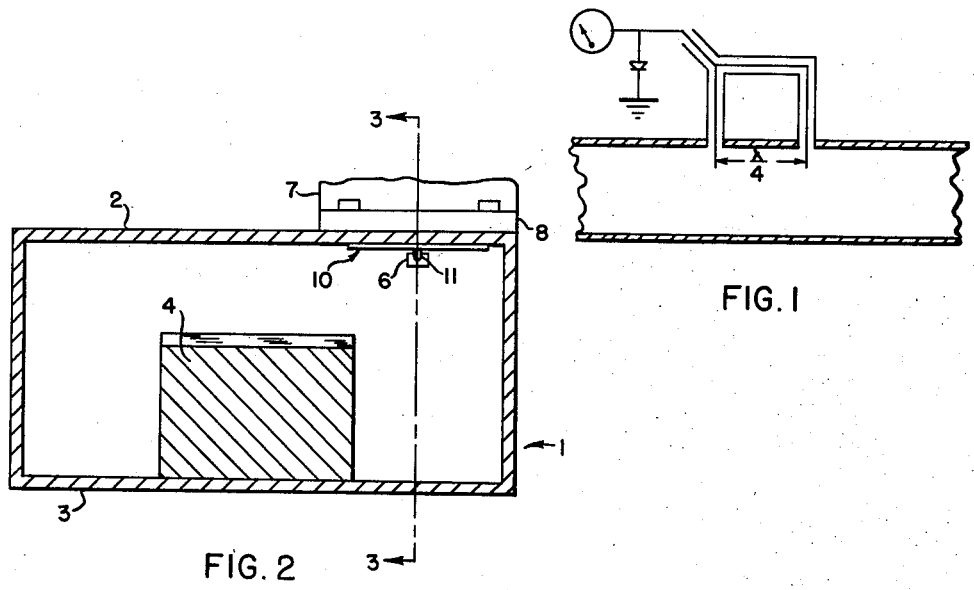
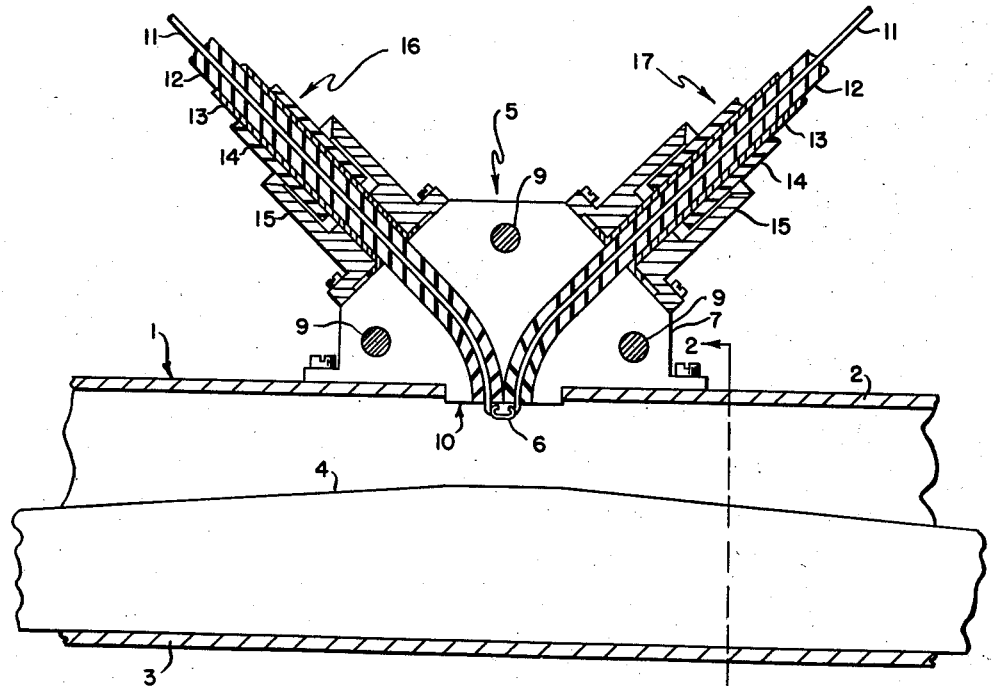
INVENTOR
HAROLD C. EARLY
BY
William D. Hall
ATTORNEY Patented Sept. 2, 1952

2,609,450

UNITED STATES PATENT OFFICE 2,609,450

RADIO FREQUENCY WATTMETER

Harold C. Early, Ann Arbor, Mich., assignor to the United States of America as represented by the Secretary of War Application April 30, 1946, Serial No. 665,991

4 Claims. (Cl. 178—44)

This invention relates generally to electrical apparatus and more particularly to a direct reading wattmeter adapted to show power consumed in a load fed through a waveguide.

In other methods of determining the power consumed in systems employing waveguide transmission the readings which are obtained due to the RF field within the guide cannot be used without corrections to compensate for: the standing wave ratio in the guide; changes in operating frequency; and the position of the pickup element inside the guide with respect to points of maximum and minimum voltage.

One method having certain advantages but nevertheless having limited usefulness is indicated in Fig. 1 of the drawing. By the use of this arrangement it is possible to distinguish between radio frequency energy traveling through the guide in opposite directions. Obviously any RF energy moving from left to right in the guide as shown in Fig. 1, reaching the two probes which are separated by a quarter wavelength corresponding to the operating frequency; and encountering a system in which the second of these probes feeds a line which is longer by one-quarter wavelength than the line fed by the first probe, will have no effect in a thermo couple fed by both of these lines at a junction at their terminations. This is due to cancellation of two voltages picked up by these probes, and this cancellation results from their 180-degree phase difference caused by a total of one-half wavelength of delay of one of them. It is equally obvious that energy moving in the opposite direction in the guide, and encountering the two probes in converse succession, will add at the thermo coupling. Therefore, the apparatus shown in Fig. 1 has the quality of being selective as to the direction of the traveling wave.

However, the function of this device will be adversely effected by changes in operating frequency. Moreover, though it can give an indication proportional to the energy moving in one direction, it cannot, by itself, give simultaneous indications of both the forward and the reflected energy nor of the difference energy between them.

It is an object of this invention to provide a direct reading wattmeter which will be selective as to the direction of movement of an RF wave traveling in a waveguide. It is a further object of this invention that the apparatus must not be frequency sensitive. It is a further object of this invention that a single device will be capable of presenting simultaneously indicator readings proportional to RF power levels of both the forward and the reflected energy in the wave guide and of the difference in power levels between them, that is the power consumed in the load. It is also an object of this invention that it should operate satisfactorily without the necessity of the pickup element being inserted into the guide at any particular point with respect to the points of voltage maxima and minima.

Generally, this invention comprises a pickup element which is selective as to the direction of propagation of RF energy moving in a waveguide and which is capable of delivering two output indications simultaneously, one proportional to forward power in the guide and the other proportional to reflected power.

Other objects, features and advantages of this invention will suggest themselves to those skilled in the art and will become apparent from the following description of the invention taken in connection with the accompanying drawing in which:

Fig. 1 is a diagrammatic sketch of the layout of a radio frequency energy indicating apparatus which is selective as to the direction of a traveling wave but which has shortcomings which have been overcome in this invention;

Fig. 2 is a transverse sectional view of a standard type of rectangular waveguide, said sectional view being taken along line 2—2 of Fig. 3. This section cuts across the waveguide itself and the tapered ramp ridge installed therein. This figure shows, not in section, an end view of a fragment of the supporting means for the pickup element and shows the relative locations of the elements of this apparatus for the $TE_{0,1}$ mode of operation.

Fig. 3 is a longitudinal sectional view of a fragment of the guide shown in Fig. 2, said view being taken along the line 3—3 of Fig. 2. This section passes through the plane where the two halves of the supporting means for the pickup element abut against one another and are fastened together.

Referring more particularly to Fig. 3, guide 1, having opposite sides 2 and 3, has a conductive tapered ramp ridge 4 attached longitudinally within it along the center of the inner surface of side 3. This element is designed according to general practice governing the design of waveguide capacitance loading elements. Obviously its taper should be gradual enough and its length sufficient, with respect to one wavelength corresponding to the lowest intended operating frequency, so that the discontinuity occasioned by its lumped capacitance is introduced gradually, and so that objectionable reflections do not occur.

Attached to the side 2 of waveguide 1 is supporting means 5 for pickup element 6. Supporting means 5 may consist of two symmetrical halves 7 and 8 (half 8 does not show in Fig. 3 but a portion of it appears in Fig. 2). After the apparatus has been assembled, these halves may be held together by any convenient means such as screw means 9. A portion of supporting element 5 extends below the bottom surface of element 5. The bottom surface of element 5 is the surface which abuts against the outside of side 2 of waveguide 1 at the point of installation. This extension is formed so as to fit tightly within an opening in side 2 and a small area 10 at the end of this extending portion replaces a section of the inner surface of side 2 which is cut out to permit the insertion of pickup element 6 and the installation of supporting element 5. Supporting element 5 may be attached to side 2 by any convenient means such as screws.

Halves 7 and 8 each have grooves of semicircular cross section cut into them so that when these halves are assembled together two substantially cylindrical or tubular channels extend from two of the opposite sides of supporting element 5; through element 5; to adjacent openings at the center of area 10. The diameters of these cylindrical orifices are equal and should be such that they will permit, within themselves, a snug fit of elements comprising sections of the center conductors with their surrounding insulating sheaths, of two low impedance, high loss, coaxial cables. These cables may be of standard type and are described more fully hereinafter.

It will be seen by reference to Fig. 3 that the cables shown therein consist of internal conductors 11, dielectric sheaths 12, which surround internal conductors 11; external conductors 13, which, as in common practice, may be braided flexible conductors or shields; and outer coverings 14 of protective material which may be dielectric.

Protective coverings 14 in this arrangement have been cut back so as to expose considerable lengths of dielectric sheaths 12 and of braided shields 13. Braided shields 13, in turn, are cut back on sheaths 12. Receptacles 15 are mechanically and electrically joined to the thus exposed outer conductors 13. Receptacles 15 are similarly attached to two opposite sides of supporting means 5 directly over the places where the two cylindrical channels enter element 5 so that the exposed portions of sheaths 12, along with inner conductors 11 which they contain, extend into and through these channels.

As a result of this arrangement, the coaxial lines are electrically continuous despite their junctions to element 5 and they will enter waveguide 1 side by side in the center of area 10 of the extended portion of supporting element 5.

At the point where inner conductors 11 emerge near the center of area 10 they are mechanically and electrically joined to opposite sides of small pickup element 6. This element, which is intended to serve both as a capacitive pickup and an inductive one, has a shape somewhat like a very short tube which may be substantially oval, rectangular, or circular in cross section, which is open along its side which is nearest to area 10 by an opening which has the form of a slot running along said side of said tube and parallel to its axis. The axis of this hypothetical tube is at right angles to the axis of the waveguide.

Regarded in this manner, it becomes apparent that there is more to this loop than a loop which would be formed by bending a thin wire into the form of a small, almost-closed circle. Instead, this loop has appreciable width relative to its other dimensions and, therefore, its side farthest from area 10 presents an appreciable area in a plane approximately parallel to area 10. This area, therefore, is roughly normal to the electric field within the guide, for the $TE_{0,1}$ mode, and, as a result, element 6 is adapted to serve, at least in part, as a capacitive pickup.

For the purposes of convenience hereinafter, the coaxial line, a portion of which is shown on the left of supporting element 5 in Fig. 3, will be referred to as coaxial line 16, and the coaxial line, a portion of which is shown correspondingly attached to the right of supporting element 5, will be referred to as coaxial line 17. Coaxial lines 16 and 17 should be low impedance, high loss lines; equal in length; identical in their characteristics; and of such length that the small amounts of energy picked up on element 6 and conveyed from it to the entrances of coaxial lines 16 and 17, will be adequate to reach the terminations of these lines despite losses, but will not be adequate, even if one hundred per cent reflection occurs at these terminations, to get back, in other than negligible amounts, to their common point of origin at pickup element 6. Across the far terminations of coaxial lines 16 and 17 there should be attached devices, such as thermocouples, which are capable of processing the RF energy reaching them so that they can actuate indicating means and produce indications proportional to the amounts of RF energy reaching said devices. These two devices should have operating characteristics as nearly alike as possible.

In operation direct power traveling along guide 1, from the source toward the load, will encounter element 6. The presence of this element will cause certain voltages to appear at the entrances, or input ends, of coaxial lines 16 and 17. A voltage capacitively picked up by element 6 will be conveyed to the two inner conductors 11 as two voltages which will be in phase. This phase relationship is due to the fact that pickup element 6 is very small with respect to one wavelength corresponding to even the highest intended operating frequency and that, therefore, the voltage along its small length will be substantially the same at any point thereon. However, the voltage inductively picked up by element 6 will be conveyed to the entrances of coaxial lines 16 and 17 as two voltages 180 degrees out of phase to each other. One of these two voltages of inductive origin will be in phase with both of the voltages of capacitive origin while the other voltage of inductive origin will be 180 degrees out of phase with both of them. Therefore, the voltage of capacitive origin in one of the coaxial lines may be increased by one of the voltages of inductive origin; whereas, the voltage of capacitive origin on the other coaxial line will be re-reduced by the other voltage of inductive origin. If quantitively the magnitudes of the voltages of capacitive origin and those of inductive origin are caused to be equal, it follows that there will be a doubling of the RF voltage in one line and complete cancellation of the RF voltages in the other. This behavior on the part of pickup element 6 is directly effected by the direction in which the traveling wave moves in the guide. Therefore, if it should happen that there is RF voltage cancellation on coaxial line 16, and RF voltage doubling on coaxial line 17, when element 6 is exposed only to forward power propagation in the guide (that is, when there is complete freedom from reflection, a condition which will exist if the guide is, in effect, infinitely long or if it is terminated in a perfectly matched load), then these voltage conditions on these two lines would be exchanged one for the other, if the direction of power propagation were reversed by exchanging the positions of the generator and the load.

If, however, reflection of RF energy from the load side of the system is permitted to occur, then neither line will have a zero RF output. Instead, additive RF voltages will simultaneously occur on both coaxial lines 16 and 17. The total RF energy appearing on one of these coaxial lines will be proportional only to the radio frequency energy in the forward moving wave while that appearing on the other will be proportional only to the radio frequency energy in the reflected wave.

It is obvious that the different outputs existing between the two thermo couple outputs at the ends of these two lines will be proportional to the power usefully consumed in the load plus any small amount of power lost in the transmission system between the pickup loop and the load. However, losses in waveguide systems are frequently negligible. Therefore this device, in such instances, will yield difference output readings (on the indicating device used) which can be considered as substantially proportional to only the power which is usefully consumed.

It has been empirically established that pickup element 6 can be proportioned so that the voltages picked up by it capacitively and inductively are equal in magnitude. This is done by proper selection of the relative areas of the cross section of the loop and of the closed side of the loop which is substantially parallel to area 10. Another factor which bears upon achieving this result is the condition of relative strengths of the magnetic and electric fields existing within the guide at the point of pick up. In this connection it has been found desirable to locate the pick up element near an edge of side 2 rather than near its center. This allows the selection of rational sizes for the dimensions of the pick up loop. Moreover, there exists in this part of the guide the desired phase relationship between the electric and magnetic vectors. Tapered ramp ridge 4 also effects the ratio of relative magnitudes of the electric and magnetic components of the RF field in the guide. For this reason it plays a part in achieving the desired results described above. Ridge 4, however, also serves an added purpose. It causes the waveguide to pass a frequency band which is wider on the long wavelength side of the pass band. That is, it reduces the low frequency cutoff frequency of the guide. It has been found that this element, at the same time, tends to maintain the magnitudes of the magnetic and electric components at a relatively constant ratio over the thus increased operating band width of the guide. For this reason, the associated use of ridge 4 makes it possible for this apparatus to remain in proper adjustment and to give useful indications when the system is operating over a band of frequencies rather than at a single pre-selected frequency.

There is another reason for locating the pick up element near to an edge of side 2 and, as well, at a certain particular distance from it. It is the need to compensate for a small phase shift produced by the uncoupled self-inductance of the loop. Since there is some capacitance between the loop and side 2 of the guide, this capacitance can be adjusted to compensate for the phase shift referred to above. Thus the exact desired phase relation described above will exist.

When the frequency of the energy passing through waveguide 1 is increased, a change occurs which can be easily described as an increase in the sensitivity of the pick up loop. In other words, the voltages picked up from both the electric and the magnetic fields in the guide increase simultaneously. However, if the adjustments already described have been made and if the general design already described has been followed, the ratio between these voltages which are picked up capacitively and inductively will remain the same despite their increases in magnitude. Because of this, and if the guide impedance remains substantially constant, the directional properties of this device will not be disturbed by increases in frequency within certain limits. These increases in voltage, however, will effect the calibration of the output indicating devices. But this effect can be eliminated without much trouble. It has been found that the losses which occur in coaxial lines 16 and 17 increase for increases in frequency and can be made to do so at approximately the necessary rate to roughly compensate for the simultaneous changes in the sensitivity of the loop. The net result can be caused to be such that the calibration of the power indicator will be accurate through the whole frequency range of operation without need for readjustment or for the use of corrective factors.

Calibration of this device can be achieved by conventional means. An example of one method would be to inject a known amount of radio frequency energy into the input end of the guide; to adjust the system for unity standing wave ratio; and, under these conditions, to calibrate the indicator (which, of course, is connected to the appropriate thermo couple, which, in turn, is attached to the appropriate coaxial line).

In this wattmeter an air thermo couple should preferably be used. In an air thermo couple the heat loss is mainly by conduction to the supports and by convection so that the direct current output is very close to the RF power or to the square of the RF current through the thermo couple. It is essential that this condition be obtained if the two thermo couple voltages are to be combined to make a direct reading instrument. In this connection it would be well to bear in mind that most thermo couple meters use a vacuum type thermo couple where the heat loss is mainly due to radiation and the relation between RF power and the direct current output is far from linear. Therefore if two air thermo couples and D. C. meters are used, the meter scales can be calibrated to read directly in watts or the scale of a single D. C. meter can be so calibrated if the apparatus is arranged to use one meter which is actuated by the difference voltage.

It is obvious in view of the principles which govern the operation of this device that its function in no way depends upon the location of the pick up element with respect to the points along the guide where voltage maxima and minima occur.

It will be obvious to those skilled in the art that any one of a wide variety of supporting means may be selected, and that there is considerable freedom of selection as to the exact conformation of the pick up element itself and as to the nature of the indicating devices employed at the terminations of the high loss lines. This freedom of selection is available without departing from the basic principles of this invention.

Accordingly I claim all deviations which fall fairly within the spirit and scope of the invention as identified in the hereinafter appended claims.

What is claimed is:

1. A wattmeter for indicating the radio frequency power consumed in a load fed by a waveguide, including a rectangular waveguide for transmission of electromagnetic energy in the $TE_{0,1}$ mode, capacitive and inductive conductive pick-up means in the form of a tubular partial loop having a diameter which is a very small fraction of one wavelength of the highest intended operating frequency and having a substantial extent in a direction normal to said diameter, means supporting said loop inside said waveguide in a plane parallel to the lines of electric force between opposite sides of said waveguide and to the axis of said waveguide, said extent of said loop being substantially perpendicular to said lines of electric force and said loop being located within said waveguide between an edge and the center of one of the two sides between which the electric field extends whereby voltages capacitively and inductively picked up within said waveguide by said loop are of equal magnitude and are either in phase or 180° out of phase at the opposite sides of said loop, two radio frequency transmission means electrically connected to the two opposite sides of said loop and disposed to transmit radio frequency energy transferred to them from said loop to points outside of said guide, said transmission means having like characteristics and substantial attenuation.

2. A wattmeter as in claim 1 in which a capacitance loading element is added to the apparatus, said loading element being mechanically and electrically attached to the inside of said waveguide to extend the lower cutoff frequency.

3. A wattmeter for measuring radio frequency energy comprising a waveguide of rectangular cross-section for the propagation of electromagnetic energy, a tubular pick-up element having a substantially flat portion and partially looped portions, means supporting said pick-up element in an off-center position in said waveguide with said flat portion normal to a component of the electric field of said electromagnetic energy and said partially looped portions normal to a component of the magnetic field of said electromagnetic energy, and a pair of means coupled to opposite sides of said partially looped portions for obtaining a pair of signals therefrom whereby said signals give an indication of the electromagnetic energy propagated in said transmission means in one direction and in the reverse direction, respectively.

4. A wattmeter for measuring radio frequency power consumed in a load fed by a waveguide including a rectangular waveguide for transmission of electromagnetic energy in the $TE_{0,1}$ mode, capacitive and inductive pick-up means having the form of a cylinder with an aperture parallel to the axis thereof and having a diameter which is a very small fraction of one wave-length of the the highest intended operating frequency, means supporting said pick-up means inside said waveguide adjacent one of the two wider sides of said rectangular waveguide and between the center and the edge of said one side and with the axis of said cylindrical pick-up means parallel to said one side and perpendicular to the two shorter sides of said rectangular waveguide, two radio frequency transmission means coupled to said cylinder on opposite sides of said aperture and disposed to transmit radio frequency energy from said pick-up means to points outside of said waveguide, said transmission means having like characteristics and substantial attenuation.

HAROLD C. EARLY.

REFERENCES CITED

The following references are of record in the file of this patent:

UNITED STATES PATENTS

| Number | Name | Date |
| --- | --- | --- |
| 2,197,123 | King | Apr. 16, 1940 |
| 2,344,641 | Rosencrans | Mar. 21, 1944 |
| 2,411,553 | Ramo | Nov. 26, 1946 |
| 2,412,393 | Ghosh | Dec. 10, 1946 |
| 2,423,416 | Sontheimer | July 1, 1947 |
| 2,443,097 | Crosby | July 8, 1948 |